United States Patent [19]
Van Gestel

[11] Patent Number: 5,565,927
[45] Date of Patent: Oct. 15, 1996

[54] METHOD OF TRANSMITTING TELETEXT PAGES WITH FORMAT-RELATED CODES

[75] Inventor: Henricus A. W. Van Gestel, Eindhoven, Netherlands

[73] Assignee: U.S. Philips Corporation, New York, N.Y.

[21] Appl. No.: 353,841

[22] Filed: Dec. 12, 1994

[30] Foreign Application Priority Data

Jun. 16, 1994 [EP] European Pat. Off. .............. 94201730

[51] Int. Cl.⁶ .................................................. H04N 7/087
[52] U.S. Cl. ............................................. 348/467; 348/468
[58] Field of Search ................................... 348/467, 468, 348/465, 463, 461, 460, 466, 478, 473; H04N 7/87, 7/8

[56] References Cited

U.S. PATENT DOCUMENTS

| | | | |
|---|---|---|---|
| 4,337,485 | 6/1982 | Chambers | 348/467 |
| 4,698,677 | 10/1987 | Kinghorn et al. | 348/468 |
| 4,908,707 | 3/1990 | Kinghorn | 348/468 |
| 4,910,595 | 3/1990 | Bugg et al. | 348/468 |
| 4,933,764 | 6/1990 | Kinghorn | 348/467 |
| 4,953,022 | 8/1990 | Bugg | 348/468 |
| 5,355,170 | 10/1994 | Eitz et al. | 348/468 |

OTHER PUBLICATIONS

J. P. Chambers, "Potential of extended teletext", Journal of the Royal Television Society, Sep./Oct. 1980, pp. 43–45.
"Teletext Specification (625 line television systems)", Interim Technical Document SPB 492, European Broadcasting Union, Dec. 1992, Geneva, pp. 1–140.

Primary Examiner—Safet Metjahic
Attorney, Agent, or Firm—David R. Treacy

[57] ABSTRACT

Teletext page signals are transmitted in a format providing only basic characters and colors, along with extension signals enlarging the character set, colors, and other presentation information which is used by decoders and display systems having more extensive capabilities. Decoders ignore extension signals intended for a higher level display than the associated apparatus. A code is added identifying the level of display for which extension signals are intended, so that extension signals can be transmitted for use only by a display of a given capability, without undesired use by a higher level display.

11 Claims, 4 Drawing Sheets

METHOD OF TRANSMITTING TELETEXT PAGES WITH FORMAT-RELATED CODES

The invention relates to a method of transmitting teletext pages, comprising the steps of transmitting a first signal which is indicative of a page in a first display format and transmitting extension signals for enhancing the page in a further display format. The invention also relates to a transmission station for transmitting teletext pages and to a teletext decoder for decoding and displaying teletext pages.

A method of transmitting teletext pages as mentioned in the opening paragraph is generally known as the World System Teletext (WST) specification and described in "Teletext Specification", Interim Technical Document SPB 492, published by the European Broadcasting Union in December 1992.

Teletext is transmitted worldwide. Generally, pages are transmitted in a first (default) display format. This display format is generally referred to as Level 1. The first signal transmitted for Level 1 display has the shape of data packets which are transmitted in the field retrace period of a television signal. The Level 1 display facilities are limited in the sense that, for example only 96 alpha-numerical and 64 graphic characters can be displayed, only one letter type is provided, only saturated colours are possible, and the like.

WST provides for the extension of the display format to higher levels. For example, Level 2 provides for an extension of the character set and in a more extensive pallet of colours. An even higher level is constituted by Level 3 which adds facilities such as dynamically redefinable character sets, italicized and bold letter display and the like to Level 2. Said enhancement of the default page is achieved by transmitting extension signals in the form of "extension packets".

A teletext decoder which is adapted to decode and display pages in a given display format ignores the extension signals which are intended for higher levels. For example, a Level 1 decoder only recognizes the data packets for the default Level 1 display format. Possible extension packets for enhancing the page to Level 2 or Level 3 display are not recognized by the Level 1 decoder. A Level 2 decoder decodes both the data packets for Level 1 and the extension packets which are indicative of Level 2. Possible extension packets for enhancing the page to Level 3 are not recognized by the Level 2 decoder. A Level 3 decoder decodes both the Level 1 data packets and extension packets for Level 2 and Level 3.

It is a task of the teletext transmitter to realise that transmission of a page in Level 2 format effects an adequate fall-back display in Level 1 decoders, and that transmission of a page in Level 3 format effects an adequate fall-back display in both Level 1 and Level 2 decoders. However, it has been found that this desired backward compatibility is not always possible. This will be illustrated by means of the following example. A station transmitting Level 3 pages wants to mark a given word in a page by displaying it in bold type. A Level 2 decoder is not provided with this facility. The station therefore desires the relevant word to be displayed in a different colour by Level 2 decoders. To achieve this, the station transmits a Level 2 extension signal for defining the different colour. Moreover, a Level 3 extension signal is transmitted for activating an attribute "bold". The latter signal is ignored by a Level 2 decoder so that it indeed displays the different colour. However, the Level 3 decoder decodes both the extension signal for defining the colour and the extension signal for displaying the word in bold type. Consequently, the Level 3 decoder displays the relevant word in both bold type and in the different colour, which was not the station's intention.

SUMMARY OF THE INVENTION

It is an object of the invention to provide a method of transmitting teletext pages with which the above-mentioned drawbacks are obviated.

According to the invention, the method is therefore characterized in that a code indicating the display format to which the extension signal relates is added to the extension signal. In the example given above, the desired compatibility is now achieved by adding a code to the extension signal for defining the different colour, which code indicates that the signal relates to Level 2 only and by adding a code to the extension signal for display in bold type, which code indicates that this signal relates to Level 3 only. The Level 3 decoder now ignores the extension signal for defining the different colour and displays the word in bold type. However, if the station wants to realise display of the word in bold type as well as display in the different colour in Level 3 decoders, a code indicating that the signal relates to both Level 2 and Level 3 will be added to the extension signal for defining the colour.

A further embodiment of the method is characterized in that a plurality of extension signals relating to one and the same display format is accommodated in a group, the code being applied to the group thus formed. This results in a reduction of transmission overhead because the code need not be added to each individual extension signal.

The code is preferably constituted by a multi-bit number, each bit of which indicates for a predefined display format whether or not the extension signal relates to this display format.

A teletext decoder for receiving and displaying the pages thus transmitted comprises decoding means for decoding the first signal and the extension signal, and display means for displaying the page in a predefined display format. The decoder according to the invention is characterized in that the decoding means are adapted to decode a code added to the extension signal for indicating the further display format and to refrain from decoding of the extension signal whose display format indicated by the code does not correspond to the predefined display format.

DESCRIPTION OF THE PREFERRED EMBODIMENT

Figure 1:
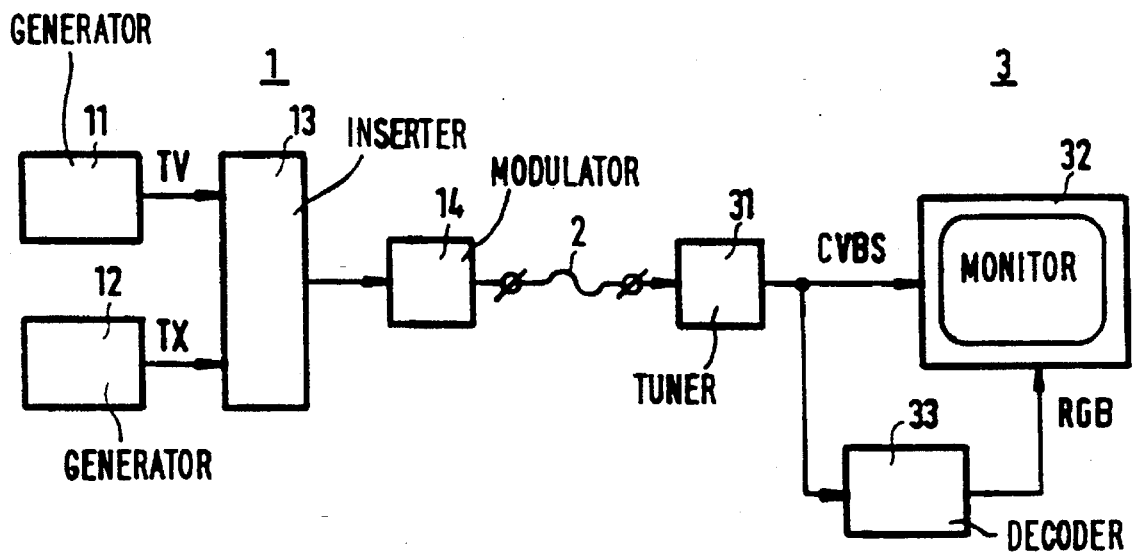
FIG. 1 shows diagrammatically a teletext transmission system to explain the method according to the invention.

FIG. 1 shows diagrammatically a teletext transmission system to explain the method according to the invention. The system comprises a transmission station 1, a transmission medium 2 and a receiver 3. The transmission station comprises a television signal generator 11, a teletext signal generator 12, a teletext inserter 13 and a modulator 14. The television generator 11 generates a picture signal TV, the teletext generator 12 generates a teletext signal TX. Both signals are combined in teletext inserter 13 to a video signal which is applied to the modulator 14 and transmitted via transmission medium 2. The receiver 3 comprises a tuner 31 for demodulating the video signal. The demodulated video signal CVBS is applied for further processing and display to a television monitor 32. The video signal is also applied to a teletext decoder 33. This decoder decodes the teletext signal accommodated therein and applies a teletext picture signal RGB to the television monitor 32.

The teletext signal comprises for each transmitted teletext page a plurality of data packets which are accommodated in further known manner in picture lines of the video signal during the field retrace period. FIG. 2 shows some possible forms of these data packets in greater detail. As has been attempted to show in this Figure, each data packet comprises 45 bytes of 8 bits each. The first 2 bytes having a fixed value 1010..10 are referred to as "clock run-in" and are denoted by CRI in the Figure. The third byte is referred to as the "framing code" F and also has a fixed value. The next 2 bytes comprise a 3-bit magazine number M and a 5-bit row number R. The significance of the other 40 bytes is dependent on the value of the row number R. If the row number R has one of the values 1–25, as assumed in FIG. 2B, then the 40 bytes constitute a text row of 40 characters for display on a display screen in the Level 1 display format.

For displaying a page in Level 2 and/or Level 3 format, one or more further data packets are transmitted for this page with a row number R in the range between 26 and 31. These packets will further be referred to as "extension packets". They are ignored by Level 1 decoders. As is shown in FIG. 2C, an extension packet has a sequence number S. By means of this number a plurality of extension packets having the same row number R can be distinguished. The other 39 bytes of the extension packet are assumed to be divided into thirteen triplets 20 of three bytes each. Such a triplet, or where necessary a series of triplets, defines the type of enhancement of the Level 1 page, as well as the character position(s) in the page to which the enhancement relates.

Figure 2A:
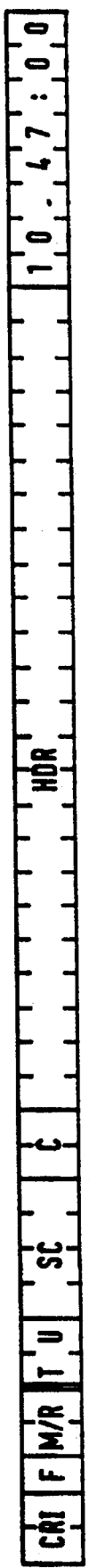
FIG. 2 shows some examples of data packets which are transmitted by a transmission station shown in FIG. 1.
Figure 2B:
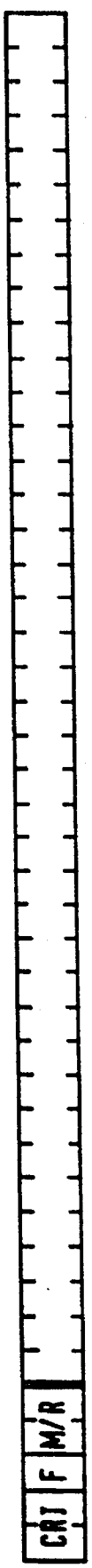
Figure 2C:
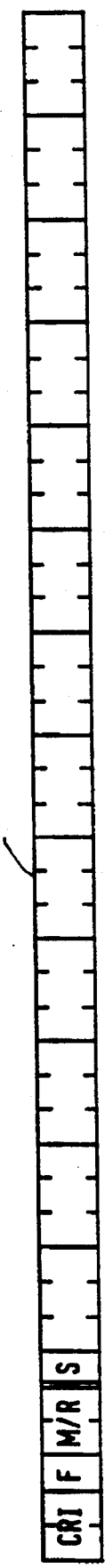

If the row number R has the value 0, as is assumed in FIG. 2A, then the data packet constitutes a header for a teletext page. The series of 40 bytes of such a header starts with two digits T (tens) and U (units) of the page number, a sub-code SC and a plurality of control bits C. The remaining part comprises 24 character positions having a page header HDR and 8 character positions for display of the current time.

The transmission of a teletext page starts with, and implies, the header of this page and subsequently comprises the relevant text rows and extension packets. The page number is constituted by the magazine number M, tens T and units U. It is a 3-digit number and is generally within the range between 100 and 899 in order that the user can select it by means of a decimal keyboard. Generally, a series of teletext pages is transmitted in a repetitive cycle.

Figure 3:
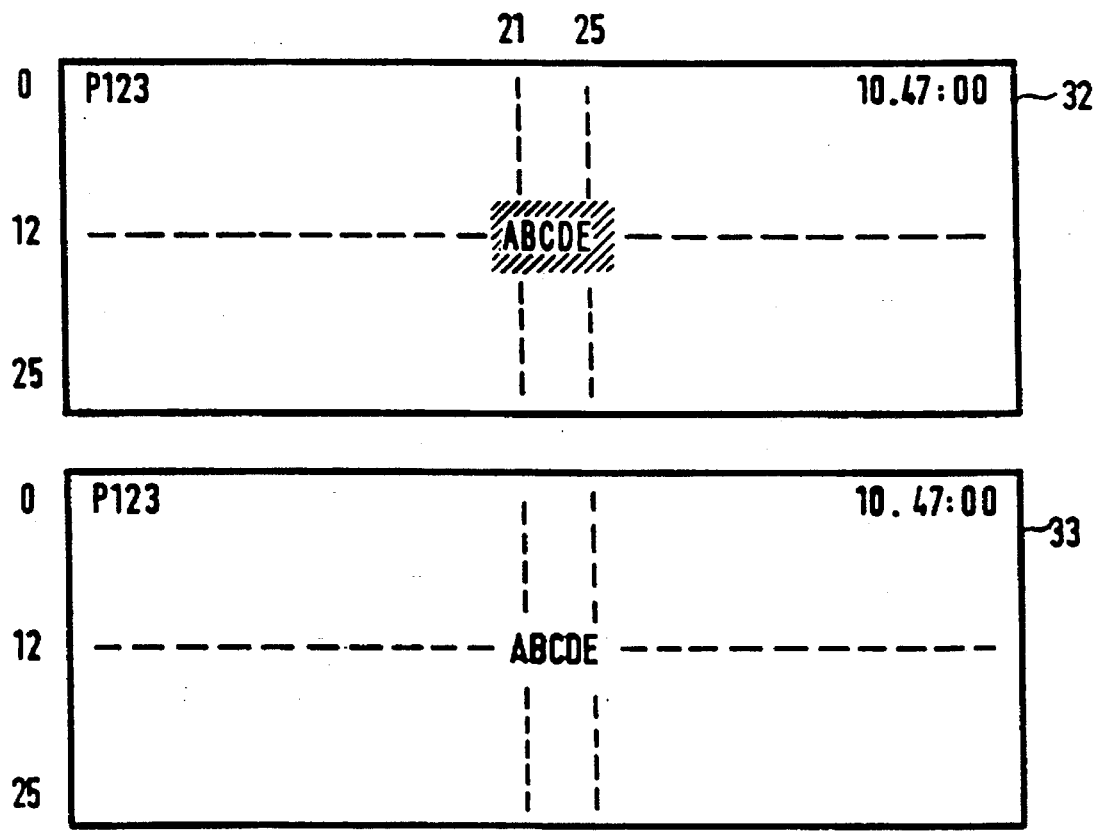
FIG. 3 shows an example of a teletext page in two different display formats.

The invention will now be further described with reference to an example. To this end, FIG. 3 shows a teletext page 32 in Level 2 format. The shaded area in this Figure shows that a word ABCDE has a different background colour. FIG. 3 shows the same teletext page 33 in Level 3 format. In this page the word ABCDE is displayed in bold type without the different background colour.

Figure 4:
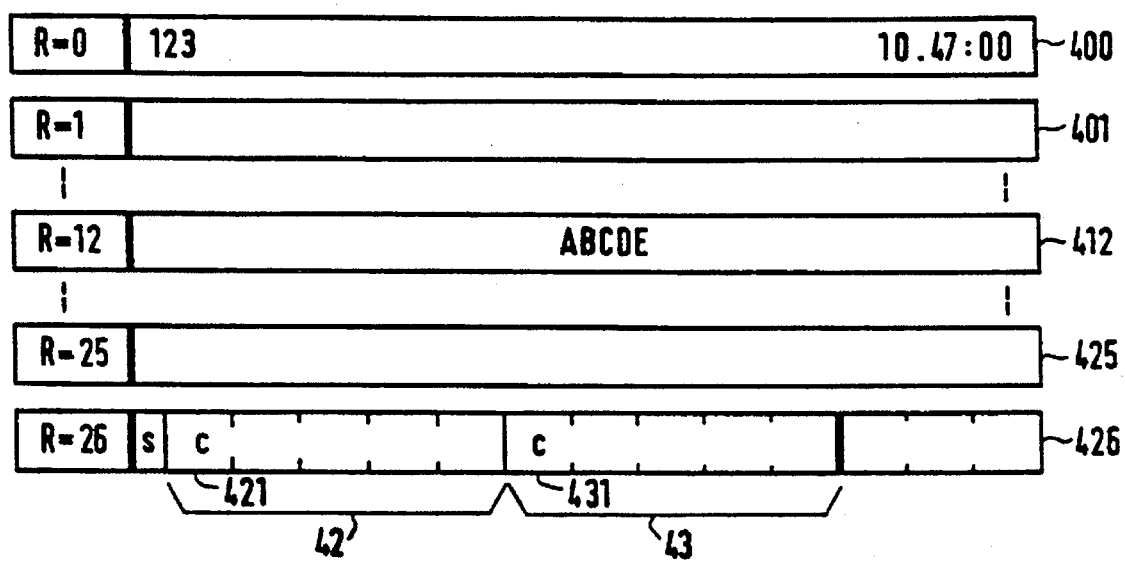
FIGS. 4 and 5 show embodiments of a sequence of data packets transmitted for a page by the transmission station shown in FIG. 1.

FIG. 4 shows the sequence of data packets transmitted for this page. The sequence comprises a header 400 with which the transmission of page 123 starts.

a plurality of data packets 401–425 for forming the page in Level 1 format. Here, data packet 412 is the data packet for row 12 which comprises the word ABCDE at character positions 21–25.

an extension packet 426 having sequential number S=0. The extension packet 426 comprises two extension signals in the form of series of triplets 42, 43. The first series 42 comprises the instructions for defining the background colour in row 12, positions 21–25. The second series 43 comprises the instructions for bold print of the characters in row 12, positions 21–25. Since the different colour or the bold print in this example are the only enhancements of the page, the rest of the extension packet is empty and there will be no further extension packets.

As is shown in FIG. 4, the first series of triplets starts with a triplet 421. The second series of triplets starts with a triplet 431. These first triplets of a series comprise a code c. This code may be formed, for example by two bits which indicate whether the relevant series of triplets is intended for Level 2 or Level 3 decoders. If both bits have the value 1, the series of triplets is intended for both Level 2 and Level 3 decoders.

The processing of the sequence of data packets by a teletext decoder shown in FIG. 4 will be elucidated hereinafter. It will be assumed that the 2-bit code in triplet 421 has the value "10" (Level 2 only) and that the 2-bit code in triplet 431 has the value "01" (Level 3 only).

A Level 1 decoder ignores all data packets having a row number R outside the range of 0–25. Consequently, it displays the page in Level 1 format in which the word ABCDE is neither displayed in the different colour nor in bold type.

A Level 2 decoder decodes the extension signal which is formed by the first series 42 of triplets. This decoding leads to display of the word ABCDE in the different colour. The Level 2 decoder ignores the extension signal which is formed by the second series 43 of triplets, because this signal defines a feature which is not implemented in the teletext decoder.

A Level 3 decoder searches the code c which is added to the first series 42 of triplets. Since this code has the value "10" (Level 2 only), the instructions for display of the word ABCDE in the different colour are., however, not carried out. The Level 3 decoder decodes the second series 43 of triplets. This leads to a display in bold type of the word ABCDE.

In the following example it will be assumed that the Level 1 page is subjected to a plurality of enhancements. These are a plurality of "Level 2 only" enhancements, a plurality of "Level 3 only" enhancements and a plurality of Level 2 enhancements which must also be performed by a Level 3 decoder (for example, both a different colour and bold type). To avoid transmission overhead, the extension signals are grouped and each group is provided with a start mark (and if desired, with an end mark). The code is accommodated in the start mark.

Figure 5:
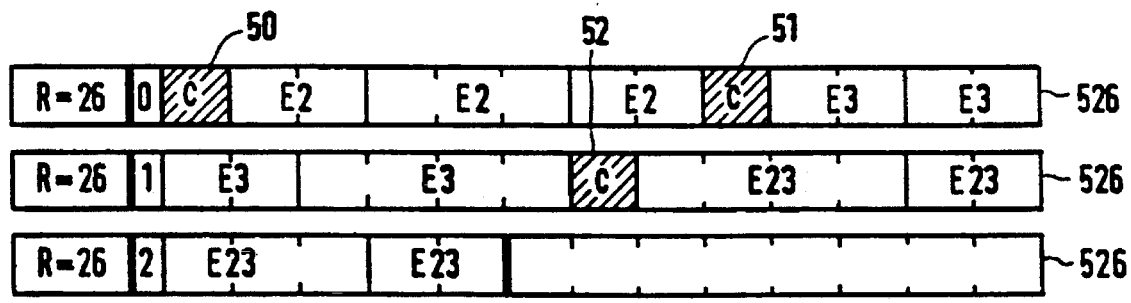

To this end, FIG. 5 shows a second example of a sequence of extension packets 526. The data packets having row number 0–25 are equal to the data packets 401–425 in FIG. 4 and therefore they are not shown. The extension packets 526 have identical row numbers (R=26) but different sequential numbers S=0, S=1 and S=2. As is shown in the Figure, the sequence of extension packets comprises a first group of extension signals E2. This group is preceded by a start mark 50 which comprises the code "10" (Level 2 only).

Subsequently, there is a group of extension signals E3 which is preceded by a start mark 51 comprising the code "01" (Level 3). Finally, there is a group of extension signals E23 which is preceded by a start mark 52 comprising the code "11" (both Level 2 and Level 3).

Figure 6:
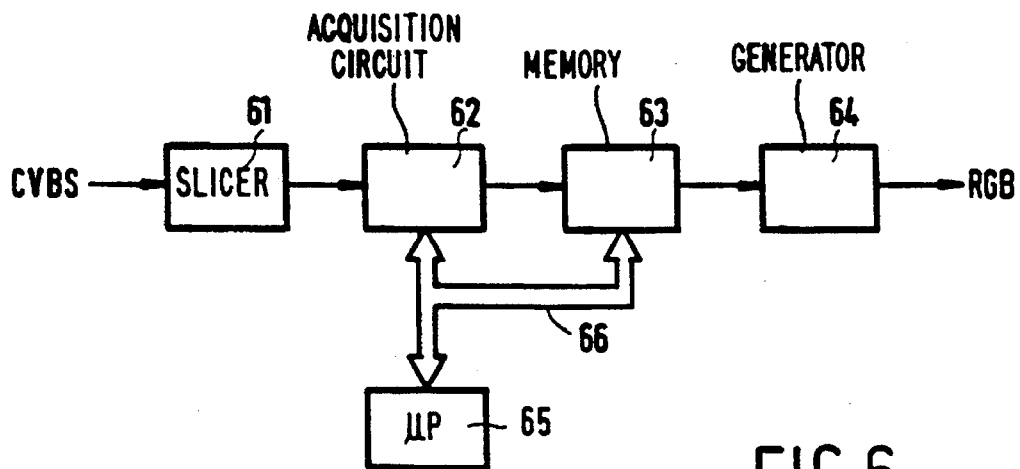
FIG. 6 shows in greater detail the teletext decoder shown in FIG. 1.

FIG. 6 shows in greater detail the teletext decoder which is denoted by 33 in FIG. 1. The decoder comprises a data slicer 61 for regaining the data packets from the video signal CVBS, an acquisition circuit 62 for selecting the data packets of a desired page, a memory 63 for storing the selected data packets and a character generator 64 for displaying a page. The decoder further comprises a microprocessor 65. Said microprocessor may read and write the memory 63 via a communication bus 66. Particularly, the microprocessor may read and process received data packets and write the result of the processing operation into the memory for display by the character generator.

Figure 7:
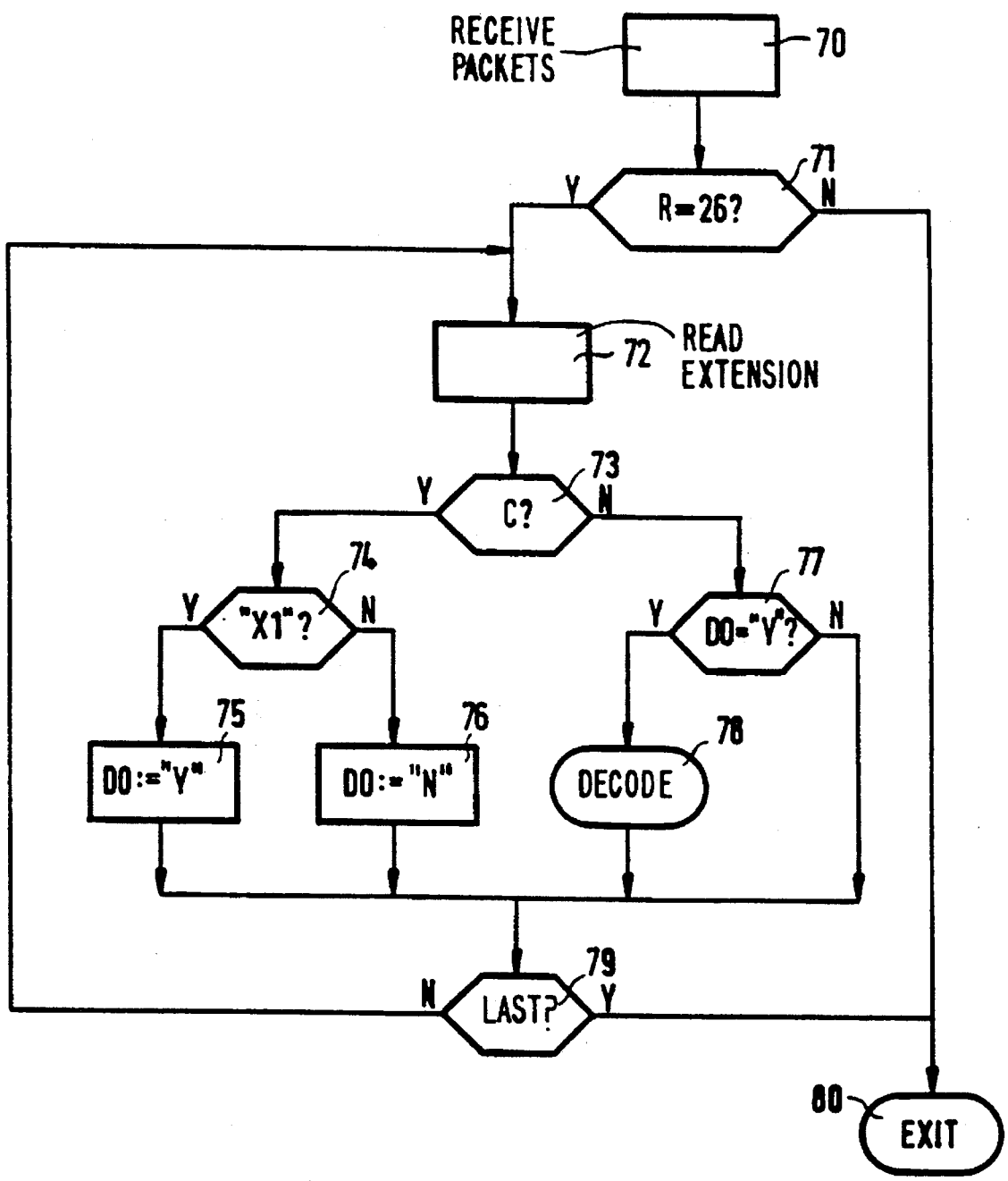
FIG. 7 shows the flow chart of a control programme executed by a microprocessor shown in FIG. 6.

The operation of the teletext decoder shown in FIG. 6 is determined by a control programme which is stored in the microprocessor. FIG. 7 shows the flow chart of this control programme. It has been assumed that the teletext decoder is adapted to display teletext pages in Level 3 format. In a step 70 the control programme waits for the reception and storage of the data packets of the desired page. In a step 71 it is ascertained whether extension packets having row number R=26 have been received. If not, the control programme, will be ended and the page will be displayed in a step 80. If one or more extension packets are stored in the memory, the triplets transmitted therein are now read successively.

In a step 72 of the control programme a triplet of the extension packet is read. In a step 73 it is subsequently ascertained whether the read triplet is of a type which comprises the 2-bit code c. If this is the case, the control programme checks in a step 74 whether the 2-bit code has the value "x1" (x stands for don't care). If this is the case, the subsequent triplets constitute an extension signal for enhancing the page to Level 3 format which can and must be performed by this decoder. The control programme stores this information by giving a parameter DO a value "Y" in a step 75. If the code c does not have the value "x1", then the subsequent series of triplets relates to an enhancement which must not be performed by the decoder. The control programme stores this information by giving the parameter DO the value 'N' in a step 76.

If it has been established in the step 73 that the read triplet is not of the type comprising a code c, then the control programme ascertains in a step 77 whether the parameter DO has the value 'Y'. If this is the case, the current triplet is decoded in a step 78 and further processed for enhancing the page. If this is not the case, the current triplet is ignored. The extension signals with code "01" and "11" are interpreted in this way and the extension signals with code "10" are ignored.

Finally, the control programme ascertains in a step 79 whether the current triplet is the last triplet. As long as this is not the case, the control programme returns to the step 72 so as to read a subsequent triplet. When all triplets have been processed in this way, the control programme is ended and the now enhanced page is displayed in step 80.

I claim:

1. A method of transmitting teletext pages, comprising the steps of:

transmitting a first signal which is indicative of a page in a first display format; and transmitting extension signals for enhancing the page in a further display format, characterized by transmitting a plurality of respective said extension signals for enhancing pages in a plurality of further display formats, and adding respective codes for the extension signals indicating to which one or more of said further display formats the respective extension signals relate.

2. A method as claimed in claim 1, characterized in that a plurality of extension signals relating to a given display format is accommodated in a group, the respective code being applied to said group.

3. A method as claimed in claim 1, characterized in that the respective codes are formed by respective bits of a multi-bit number, each bit indicating for a predefined display format whether a particular extension signal relates to the predefined display format.

4. A method as claimed in claim 1, characterized in that said first display format is a format for Level 1 display, and said further display formats include formats for Level 2 and Level 3.

5. A transmission station for transmitting teletext pages, comprising:

means for transmitting a first signal which is indicative of a page in a first display format; and means for transmitting extension signals for enhancing the page in a further display format,
   characterized in that said means for transmitting extension signals comprises:

means for transmitting a plurality of respective said extension signals for enhancing pages in a plurality of further display formats, and means for adding respective codes for the extension signals indicating to which one or more of said further display formats the respective extension signals relate.

6. A transmitting station as claimed in claim 5, characterized in that said means for transmitting extension signals accommodates a plurality of extension signals relating to a given display format in a group, and applies the respective code to said group.

7. A transmitting station as claimed in claim 5, characterized in that the respective codes are formed by respective bits of a multi-bit number, each bit indicating for a predefined display format whether a particular extension signal relates to the predefined display format.

8. A transmitting station as claimed in claim 5, characterized in that said first display format is a format for Level 1 display, and said further display formats include formats for Level 2 and Level 3.

9. A teletext receiver for signals indicative of pages in one display format, and for extension signals for enhancing said pages in a plurality of further display formats, said extension signals having codes added thereto indicating to which one or more of said further display formats the respective extension signals relate, comprising:

decoding means for decoding one of said signals which is indicative of one page in said one display format, and for decoding extension signals for enhancing said one page in a predefined one of said plurality of further display formats means, responsive to the code relating to said predefined one of said further display formats, for decoding only the extension signals relating thereto, and, display means for displaying the page in said predefined one of said further display formats.

10. A teletext receiver as claimed in claim 9, characterized in that the code is constituted by a multi-bit number, and the means for decoding refrains from decoding one of said extension signals if a predetermined bit of the multi-bit number does not have a predetermined value.

11. A teletext receiver as claimed in claim 9, wherein said display means is a Level 3 display, and said one display format is a format for Level 1 display, characterized in that said further display formats include formats for Level 2 and Level 3, and said means for decoding decodes only extension signals relating to Level 3.

* * * * *